(12) United States Patent
Wisnia et al.

(10) Patent No.: US 10,400,735 B2
(45) Date of Patent: Sep. 3, 2019

(54) SYSTEM AND METHOD FOR REMOTE STARTING A VEHICLE EQUIPPED WITH A SMART START SYSTEM

(71) Applicant: LIGHT WAVE TECHNOLOGY INC., Ville St-Laurent (CA)

(72) Inventors: Jack Wisnia, Dollard-des-Ormeaux (CA); Robert Nelson, Westmount (CA)

(73) Assignee: LIGHT WAVE TECHNOLOGY INC., St-Laurent, QC (CA)

( * ) Notice: Subject to any disclaimer, the term of this patent is extended or adjusted under 35 U.S.C. 154(b) by 849 days.

(21) Appl. No.: 13/834,878

(22) Filed: Mar. 15, 2013

(65) Prior Publication Data
US 2013/0297194 A1 Nov. 7, 2013

Related U.S. Application Data

(60) Provisional application No. 61/642,623, filed on May 4, 2012.

(51) Int. Cl.
*F02N 99/00* (2010.01)
*F02N 11/08* (2006.01)
(52) U.S. Cl.
CPC .......... *F02N 99/00* (2013.01); *F02N 11/0807* (2013.01)
(58) Field of Classification Search
CPC .............. B60R 25/1003; B60R 25/209; G07C 9/00309; G07C 2009/00793; G07C 2009/00206; G08C 17/00; F02N 99/00; F02N 11/0807; F02N 11/0814; F02N 11/0803; F02N 11/08

USPC ....... 340/426.17, 5.61, 5.62, 426.18, 426.13, 340/426.35, 426.36, 4.11, 4.2, 13.2, 298; 701/2, 113; 123/366, 406.53, 685, 491, 123/179.1, 179.2, 179.3, 179.4, 179.5, 123/179.6, 179.24
See application file for complete search history.

(56) References Cited

U.S. PATENT DOCUMENTS

| 3,788,294 A * | 1/1974 | Logan ................. F02N 11/0807 123/179.2 |
| 5,874,785 A * | 2/1999 | Liu ......................... B60R 25/04 123/179.2 |
| 5,937,065 A * | 8/1999 | Simon ..................... B60R 25/24 380/262 |
| 6,037,675 A * | 3/2000 | Yoshida .............. B60R 16/0315 180/287 |

(Continued)

*Primary Examiner* — Lindsay M Low
*Assistant Examiner* — John D Bailey
(74) *Attorney, Agent, or Firm* — Anglehart et al.

(57) ABSTRACT

A system for remote starting a vehicle equipped with a keyless go system. The keyless go system is adapted to start the vehicle upon receipt of a proper response to a challenge emitted by the keyless go system, the response being computed by a key fob. A first interface is located proximate the keyless go system, the first interface being adapted to relay the challenge from the keyless go system to a second interface, and to receive the response from the second interface and relay the response to the keyless go system. A second interface is located proximate the key fob, the second interface being adapted to receive the challenge and relay the challenge to the key fob and being adapted to receive the response and relay the response to the first interface. The car can be remote started from a distant location, without having to disable the on-board security system of the car.

9 Claims, 3 Drawing Sheets

(56) References Cited

U.S. PATENT DOCUMENTS

| | | | | |
|---|---|---|---|---|
| 6,208,239 B1* | 3/2001 | Muller | B60R 25/24 | 340/10.1 |
| 6,323,566 B1* | 11/2001 | Meier | G07C 9/00309 | 307/10.2 |
| 6,414,586 B1* | 7/2002 | Yoshizawa | B60R 25/24 | 307/10.2 |
| 6,662,085 B2* | 12/2003 | Chang | B60R 25/209 | 341/176 |
| 6,778,065 B1* | 8/2004 | Asakura | B60R 25/245 | 340/12.5 |
| 7,650,864 B2* | 1/2010 | Hassan | B60R 25/045 | 123/179.2 |
| 7,683,757 B2* | 3/2010 | King | B60R 25/24 | 340/5.72 |
| 8,077,011 B2* | 12/2011 | McBride | B60R 25/245 | 340/10.1 |
| 8,112,185 B2* | 2/2012 | Wu | B60R 25/045 | 123/179.12 |
| 8,254,869 B2* | 8/2012 | Hyde | H04B 1/082 | 455/345 |
| 8,421,589 B2* | 4/2013 | Sultan | B60R 25/1003 | 340/426.13 |
| 8,825,224 B2* | 9/2014 | Fazi | F02D 45/00 | 701/2 |
| 8,983,534 B2* | 3/2015 | Patel | G08C 17/02 | 340/5.25 |
| 2004/0056776 A1* | 3/2004 | Tsuji | B60R 25/24 | 340/12.22 |
| 2004/0222899 A1* | 11/2004 | Yezersky | B60R 25/257 | 340/12.5 |
| 2005/0033484 A1* | 2/2005 | Geber | B60R 25/24 | 701/1 |
| 2005/0154511 A1* | 7/2005 | Proefke | B60R 25/04 | 701/29.6 |
| 2005/0168322 A1* | 8/2005 | Appenrodt | B60R 25/246 | 340/5.72 |
| 2006/0071555 A1* | 4/2006 | Borngraber | B60R 25/045 | 307/10.1 |
| 2006/0114100 A1* | 6/2006 | Ghabra | E05B 81/78 | 340/5.61 |
| 2006/0164207 A1* | 7/2006 | Wilcox | B60R 25/24 | 340/5.61 |
| 2006/0266089 A1* | 11/2006 | Dimig | B60R 25/24 | 70/252 |
| 2007/0021082 A1* | 1/2007 | Okumura | B60C 23/0408 | 455/142 |
| 2007/0085658 A1* | 4/2007 | King | B60R 25/24 | 340/5.72 |
| 2008/0106391 A1* | 5/2008 | Santavicca | B60R 25/209 | 340/426.36 |
| 2008/0109123 A1* | 5/2008 | Kachouh | G07C 9/00309 | 701/2 |
| 2008/0122595 A1* | 5/2008 | Yamamichi | B60R 25/2018 | 340/426.16 |
| 2008/0309457 A1* | 12/2008 | Jones | B60R 25/24 | 340/5.62 |
| 2009/0009303 A1* | 1/2009 | Fujioka | B60C 23/0408 | 340/426.36 |
| 2009/0133453 A1* | 5/2009 | Mueller | B60R 25/02153 | 70/252 |
| 2009/0206989 A1* | 8/2009 | Leitch | B60R 25/24 | 340/5.61 |
| 2009/0212906 A1* | 8/2009 | Michel | B60R 25/2072 | 340/5.61 |
| 2010/0207753 A1* | 8/2010 | Sugiura | B60C 23/0408 | 340/447 |
| 2010/0217457 A1* | 8/2010 | Georgi | B60R 25/245 | 701/2 |
| 2010/0231351 A1* | 9/2010 | Lickfelt | B60R 25/04 | 340/5.6 |
| 2010/0305779 A1* | 12/2010 | Hassan | G01C 17/38 | 701/2 |
| 2011/0102138 A1* | 5/2011 | Girard, III | G01S 11/06 | 340/5.61 |
| 2011/0102139 A1* | 5/2011 | Girard, III | H04L 63/102 | 340/5.61 |
| 2011/0112969 A1* | 5/2011 | Zaid | G06Q 10/02 | 705/50 |
| 2011/0257817 A1* | 10/2011 | Tieman | B60R 25/24 | 701/2 |
| 2011/0293095 A1* | 12/2011 | Ben Ayed | H04L 63/0492 | 380/270 |
| 2012/0019379 A1* | 1/2012 | Ben Ayed | G08B 13/1436 | 340/539.1 |
| 2012/0031155 A1* | 2/2012 | Shimura | E05B 19/0082 | 70/408 |
| 2012/0208520 A1* | 8/2012 | Howarter | B60R 25/2009 | 455/420 |
| 2012/0268242 A1* | 10/2012 | Tieman | B60R 25/24 | 340/5.61 |
| 2012/0280788 A1* | 11/2012 | Nowottnick | G06K 19/07767 | 340/5.61 |
| 2012/0303182 A1* | 11/2012 | Choi | G08C 17/02 | 701/2 |
| 2013/0079952 A1* | 3/2013 | Fazi | F02D 45/00 | 701/2 |
| 2013/0110318 A1* | 5/2013 | Colja | H02J 5/005 | 701/2 |
| 2013/0176069 A1* | 7/2013 | Leong | B60R 25/24 | 327/517 |
| 2013/0179005 A1* | 7/2013 | Nishimoto | B60R 25/1001 | 701/2 |
| 2013/0214900 A1* | 8/2013 | Mitchell | G07C 9/00309 | 340/5.61 |
| 2013/0268141 A1* | 10/2013 | Du | G06F 17/00 | 701/2 |
| 2013/0268142 A1* | 10/2013 | Du | B62D 15/027 | 701/2 |
| 2013/0268143 A1* | 10/2013 | Du | G06F 17/00 | 701/2 |
| 2013/0268144 A1* | 10/2013 | Du | G08C 17/02 | 701/2 |
| 2014/0240086 A1* | 8/2014 | Van Wiemeersch | B60R 25/25 | 340/5.51 |
| 2014/0240090 A1* | 8/2014 | Mutti | G07C 9/00309 | 340/5.61 |
| 2014/0285319 A1* | 9/2014 | Khan | G07C 9/00309 | 340/5.61 |
| 2014/0327517 A1* | 11/2014 | Portet | G01S 13/84 | 340/5.61 |

\* cited by examiner

SYSTEM AND METHOD FOR REMOTE STARTING A VEHICLE EQUIPPED WITH A SMART START SYSTEM

FIELD OF THE INVENTION

The present invention relates to a system and method for remote starting a vehicle equipped with a smart start system.

DESCRIPTION OF THE PRIOR ART

Remote car starters, both OEM (original equipment manufacturer) and after market, are now well known in the art. In most of these systems, the remote starting module tricks the vehicle into starting the engine even though the user is not physically in the car.

Passive keyless entry and start systems (PKES) are also well known in the art. Starting out as systems of higher end cars, they can now be found on some entry level vehicles. In these systems, users can enter and start their cars all the while having their keys in a pocket or handbag.

Smart start systems, also known as keyless go systems (KG) are also well known, and include the features of a PKES without the passive keyless entry.

Installing remote car starters in vehicles equipped with PKES systems or smart starts is possible, but involves devices that interact closely with the car's on-board systems.

Smart start systems usually come in one of two flavours: in one case, a challenge is constantly emitted by the car; and in the other case, the car is triggered into emitting the challenge by a trigger. In both cases the challenge can be identical from one instance to another, or it could be what is known as a rolling code, i.e. the content of the challenge changes from one instance to another.

The case where the car constantly emits a rolling code challenge will be first looked at.

Generally speaking, in such cases, the car emits a beacon (rolling challenge) on a low frequency channel, which is received by the key fob when it is in proximity of the car. When the beacon is received at the key fob, it wakes a microcontroller embedded in the key fob. The microcontroller computes a response thereto. This response is usually emitted on a UHF channel. If the response is valid, the car unlocks the doors. When the user pushes the start button, a similar sequence of communication takes place, so that the car can ascertain the key is present inside the car before starting the engine.

In the case where the car is triggered into emitting a challenge, the trigger is usually the act of placing a hand on a door handle that is equipped with a sensor (in the case of a PKES system). This wakes the car, and the door is unlocked if the appropriate response to the challenge is received. Subsequently, in order to actually start the car, the other trigger is usually from the user pressing on the brake pedal, or pushing a push-to-start button on the dash of the vehicle, or both.

Although reference is made above to "car" as being the entity that actually lock/unlocks the vehicle or starts the engine, the reader will appreciate that this is a shortcut, and that the known systems and subsystems within the vehicle, provide the appropriate commands in sequence to actuate the locking/unlocking of a door, for example, and the starting of an engine, as another example.

As is also known in the art, the signals emitted and received by the car and by the key fob are encrypted using known means, in order to defeat would-be thieves.

It has been suggested in the literature that PKES systems present a weakness theoretically permitting thieves to steal vehicles using relay attacks. Relay attacks are also known in the art of communications, and in their most basic form, messages are relayed from one location to another in order to make one entity look closer to another. An example of a relay attack on RFID consists of first demodulating a signal, transmitting it as digital information using RF and then modulating it near the victim tag. In such a setup, the relay can add up to 15 to 20 microseconds of delay. In order to counter this potential threat, some OEM systems now include countermeasures, such as requiring that the proper response be received within a predetermined time frame.

The relay attacks suggested in the literature however require two persons to defeat the security system on board the vehicle. A first person is located near the vehicle, and is equipped with a transceiver. A second person follows the driver of the vehicle with another transceiver, which is linked to the first transceiver. The first person mimics attempting to gain access to the vehicle, triggering the initiation of communication by the vehicle. The signals emitted by the vehicle are captured by the first transceiver and relayed to the second transceiver, which is located proximate the key fob of the driver of the vehicle, in order to trick the fob to compute a response. The response is captured by the second transceiver, relayed to the first transceiver, which serves the response to the vehicle. In this manner, access to the vehicle is gained, and the similar sequence can be repeated to actually start the car.

SUMMARY OF THE INVENTION

The present invention is directed to a method and system for remote starting a car provided with a PKES or a smart start system. A pair of interfaces is provided, one in the car and the other on the key chain where the key fob is present, and preferably a very short distance away. The interface in the car mimics the user performing the steps required to start the car, by, for example, pressing the brake pedal and pushing the start button.

The second interface interacts with the key fob to receive challenges emitted by the car and relayed by the first interface, transmit them to the key fob for the key fob to prepare the appropriate response. The response is relayed from the second interface to the first interface.

A simple and relatively inexpensive remote car starter is thus provided.

In accordance with a first aspect of the invention, there is provided a vehicle equipped with a keyless go system, a method for remote starting the vehicle comprising the steps of:

providing a first interface, the first interface being located inside the vehicle and proximate the keyless go system, the first interface being adapted to communicate with the keyless go system through a first low frequency transceiver and a first high frequency transceiver, and being further provided with a second high frequency transceiver;

providing a second interface, the second interface being located proximate a key fob linked to the vehicle, the second interface being adapted to communicate with the key fob through a second low frequency transceiver and a third high frequency transceiver, and being further provided with a fourth high frequency transceiver;

capturing a challenge emitted by the keyless go system with the first low frequency transceiver;

converting the challenge into a format adapted to be transmitted by the second high frequency transceiver;

receiving the challenge with the fourth high frequency transceiver;

converting the challenge from the fourth high frequency transceiver for transmission by the second low frequency transceiver;

at the key fob
receiving the challenge;
computing a response thereto; and
emitting the response;

receiving the response with the third high frequency transceiver;

converting the response into a format adapted to be transmitted by the fourth high frequency transceiver;

receiving the response with the second high frequency transceiver;

converting the response from the second high frequency transceiver for transmission by the first high frequency transceiver;

delivering the response to the keyless go system; and if the response is a proper response to the challenge, initiating the starting of the vehicle by the keyless go system.

In accordance with a second aspect of the invention, there is provided a system for remote starting a vehicle equipped with a keyless go system, the keyless go system being adapted to start the vehicle upon receipt of a proper response to a challenge emitted by the keyless go system, the response being computed by a key fob, the system comprising:

a. a first interface located proximate the keyless go system, and including a first low frequency transceiver, a first high frequency transceiver and a second high frequency transceiver;

b. a second interface located proximate the key fob, the second interface including a second low frequency transceiver, a third high frequency transceiver and a fourth high frequency transceiver;

the first interface being adapted to capture the challenge with the first low frequency transceiver and emit the challenge through the second high frequency transceiver; and to receive the response through the second high frequency transceiver and forward the response to the keyless go system through the first high frequency transceiver;

the second interface being adapted to receive the challenge through the fourth high frequency transceiver and to forward the challenge to the keyfob through the second low frequency transceiver; and to receive the response with the third high frequency transceiver and to emit the response through the fourth high frequency transceiver.

In accordance with a third aspect of the invention, there is provided a system for remote starting a vehicle equipped with a keyless go system, the keyless go system being adapted to start the vehicle upon receipt of a proper response to a challenge emitted by the keyless go system, the response being computed by a key fob, the system comprising:

a. a first interface located proximate the keyless go system, the first interface being adapted to relay the challenge from the keyless go system to a second interface, and to receive the response from the second interface and relay the response to the keyless go system;

b. the second interface being located proximate the key fob, the second interface being adapted to receive the challenge and relay the challenge to the key fob and being adapted to receive the response and relay the response to the first interface.

In accordance with a fourth aspect of the invention, there is provided a system for remote starting a vehicle equipped with a keyless go system, the keyless go system being adapted to start the vehicle upon receipt of a proper response to a challenge emitted by the keyless go system, where the challenge C is a constant challenge, the system comprising:

a. a first interface located proximate the keyless go system, the first interface for storing at least one response to the challenge, and to receive the response from the second interface and relay the response to the keyless go system;

b. the second interface being located proximate the key fob, the second interface having a memory for storing the challenge, and being adapted to relay the challenge to the key fob and being adapted to receive the response and relay the response to the first interface;

wherein when a user actuates the second interface to remote start the vehicle, the first interface triggers the keyless go system into issuing the challenge, and subsequently relays the response stored in memory to the keyless go system in order to effect remote starting of the vehicle.

BRIEF DESCRIPTION OF THE DRAWINGS

The present invention and its advantages will be more easily understood after reading the following non-restrictive description of preferred embodiments thereof, made with reference to the following drawings in which.

DESCRIPTION OF A PREFERRED EMBODIMENT OF THE INVENTION

Figure 1:
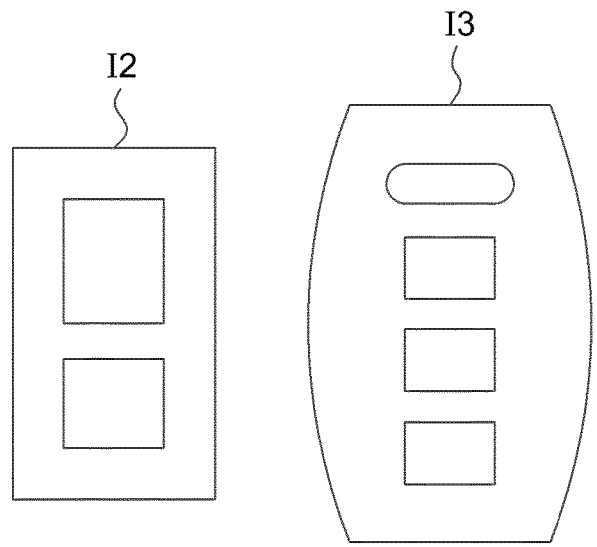
FIG. 1 is a schematic representation of main components of a system according to a preferred embodiment of the invention.
Figure 1:
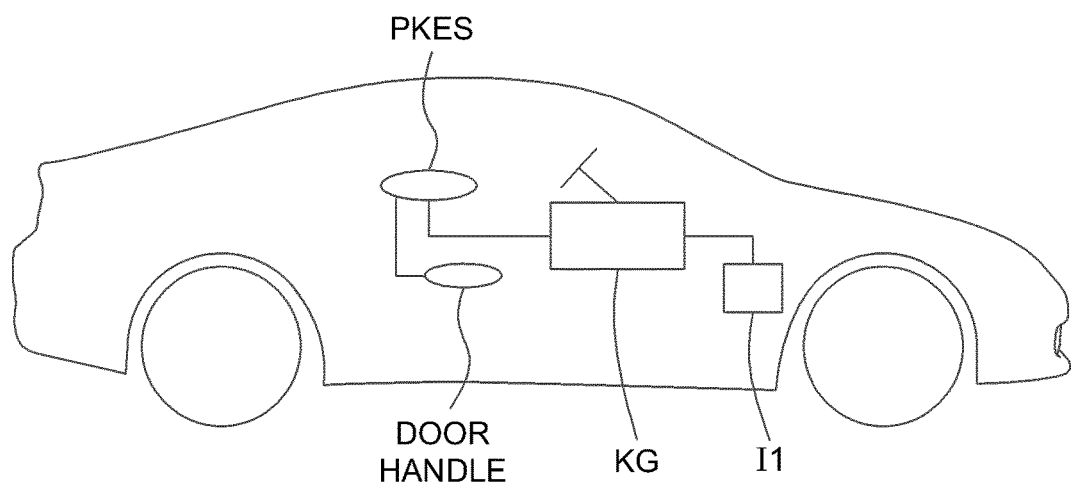
Figure 2:
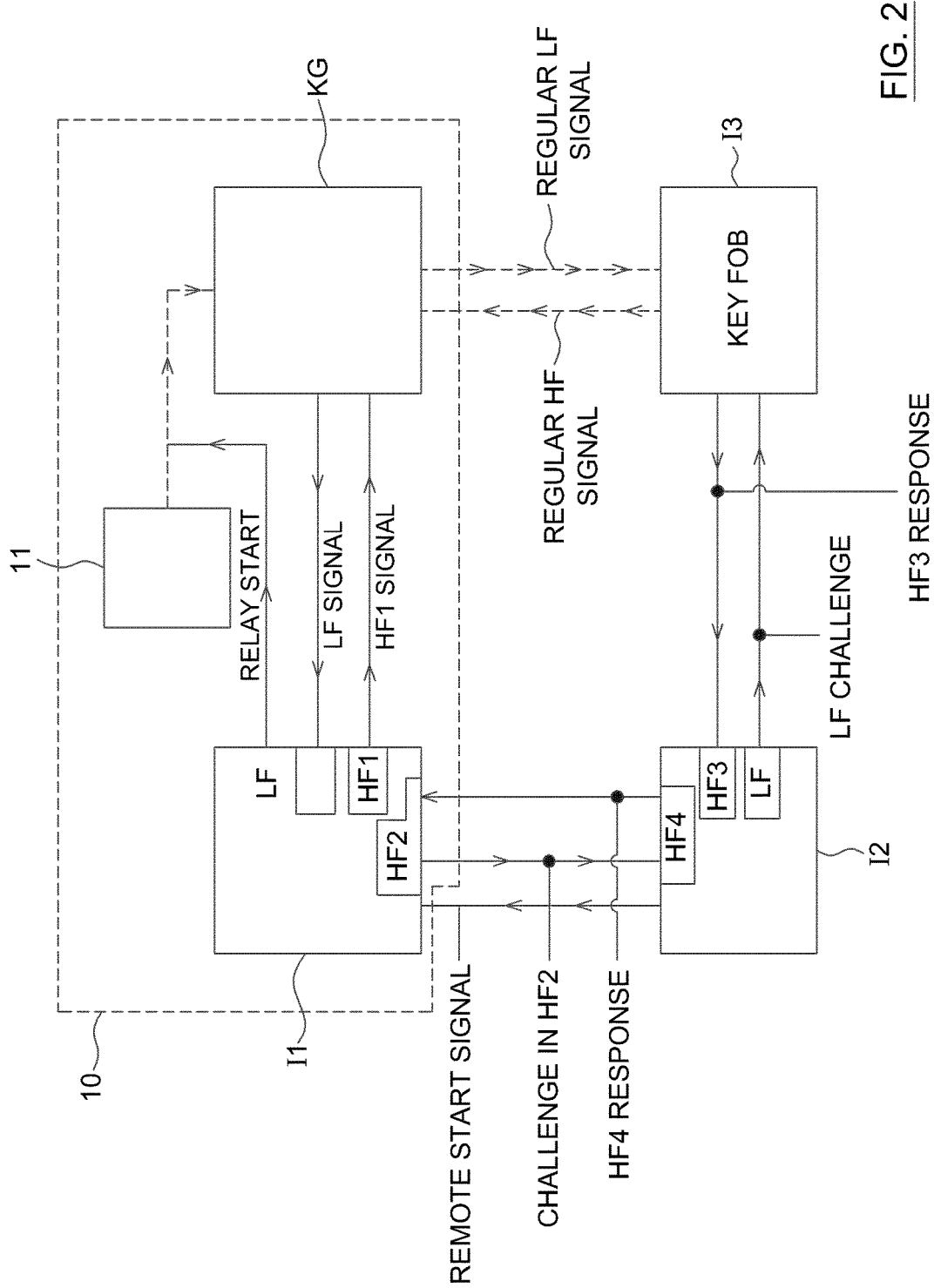
FIG. 2 is a schematic representation of the components of the system in both the car and outside the car.

The present invention builds on the principle of relayed signals in order to remote start a car 10 equipped with a PKES or a smart start KG. The present description will focus more specifically on a car equipped with a smart start system, but a person skilled in the art will readily recognize that adapting the system of the invention to a car equipped with a PKES system involves minor modifications only, and directed to unlocking/locking the car, or mimicking these steps, prior to actually starting the engine. A person skilled in the art will also appreciate that the sequence of events can be triggered, in the case of a car equipped with a PKES, with touching a door handle equipped with a sensor. In addition, the push to start feature of a car involves pressing a start button 11, usually located in the dash of the vehicle.

Controlling the lock/unlock function in a remote relay start system is an important function. By means of controlling the lock/unlock function, a relay system can effectively disarm/arm the vehicle security system without connecting the additional wires or installing additional equipment to control lock/unlock and arm/disarm the vehicle.

In the present invention, the basic principle of relay is used to remote start the car.

An interface module I1 is installed in the car. This interface module is adapted to interface with the car's on-board system, and, in the case of a PKES system, to send signals that mimic an actual user attempting to gain entry into the vehicle and start it.

The interface I1 is comprised of a low frequency reader LF, and a high frequency transmitter HF1, which preferably operates on the same frequency as the frequency F of the user's key fob 13. The interface I1 also includes a second high frequency transmitter HF2. HF2 may or may not operate on the same frequency F of the key fob. In a preferred embodiment of the invention, the interface I1 is installed in the vehicle, most preferably proximate the keyless go unit KG of the vehicle, and adapted to communicate therewith.

Interface I1 is designed to communicate through transmitter HF2 at long ranges, and by long ranges, it should be understood that distances between 500 m and 1500 m. Long in the context of the present specification is to be contrasted to the short range transmissions, usually in the order of a few feet (in the order of a meter), that the vehicle and key fob are designed for.

Another interface is provided, but this second interface is placed very near an authorized key fob, in the sense that the key fob is paired with the vehicle.

Interface I2 includes a low frequency transmitter LF adapted to communicate with the key fob. Interface I2 further includes a high frequency receiver HF3, which operates on the same frequency F as the key fob. Interface I2 also includes another high frequency transceiver HF4. HF4 may or may not operate on the same frequency F of the key fob, but operates on the same frequency as HF2 in order to communicate therewith.

It will be appreciated by the reader that the expression "transceiver" is used when making reference to LF1, LF2, HF1-4. However, it will be understood that "transceiver" also, for the purposes of the present invention, includes "transmitter" or "receiver". Indeed, in most cases, LF1 can be replaced by a receiver—there is no actual need to emit any signal with LF1. Similarly, LF2 can be replaced by a transmitter. HF3 can be replaced by a receiver, and HF1 by a transmitter. In a preferred embodiment, only HF2 and HF4 need to possess both receiving and transmitting capabilities.

The second interface I2 is provided with e.g. a button, indicating that the user wishes to remote start the car. The second interface I2 emits a signal over the frequency of operation of HF4, which signal is received by the first interface. The signal can also be encrypted using known methods, and can be further sent using a variety of communication protocols, for example spread spectrum.

The first interface, upon receipt of the signal, interacts with the keyless go system of the car KG to mimic a user approaching the vehicle or touching a handle. This triggers the car into emitting the beacon signal on the LF channel. This beacon is captured by the first interface I1 with low frequency transceiver LF and relayed to the second interface I2 through HF2. It should be noted that no modifications of any sort are made to the communication signals and protocols emitted and received by the car, other than perhaps up-modulating and down modulating the beacon.

The second interface I2 receives the beacon and relays it to the key fob through LF. The key fob performs as it should and computes a response to the car. The response is captured by the second interface through HF3 and relayed to the first interface through HF4. Interface I1 received the response with HF2, and which relays the response to the car through HF2. This verifies that the key fob is authorized to permit entry into the vehicle. Of course, as this is a remote car starter, the first interface actually ensures that all doors and the trunk are locked prior to starting the vehicle.

Once this first step of authorization is completed, the first interface then proceeds to mimic a user starting the vehicle. In many cases, this is a combination of the user pressing the brake pedal and pressing a "start" button on the dash.

The first interface interacts with the on-board system and triggers the car into sending another challenge to the key fob, as if the user was physically inside the vehicle. The challenge is once again captured by the first interface and relayed to the second interface. The second interface relays the challenge to the key fob, which computes the appropriate response. The response is then captured with the second interface, relayed to the first interface, and then provided to the car, in order to start the ignition of the car. The first interface also communicates with the KG on board the vehicle, to provide the appropriate signals equivalent to pressing a brake pedal.

In order for such a system to be effective, it must introduce as little delay as possible during the relaying steps of the communication. This is because some car manufacturers, in order to add a level of security to PKES systems, require that the response to a given challenge be correctly received within a predetermined time frame. Therefore, any undue delay would defeat the use of a relay for remote starting the car.

If the car is not equipped with a PKES system, the initial step of mimicking a user attempting to gain entry into the vehicle are omitted, and the steps of remote starting the car proceed as described above.

Figure 3:
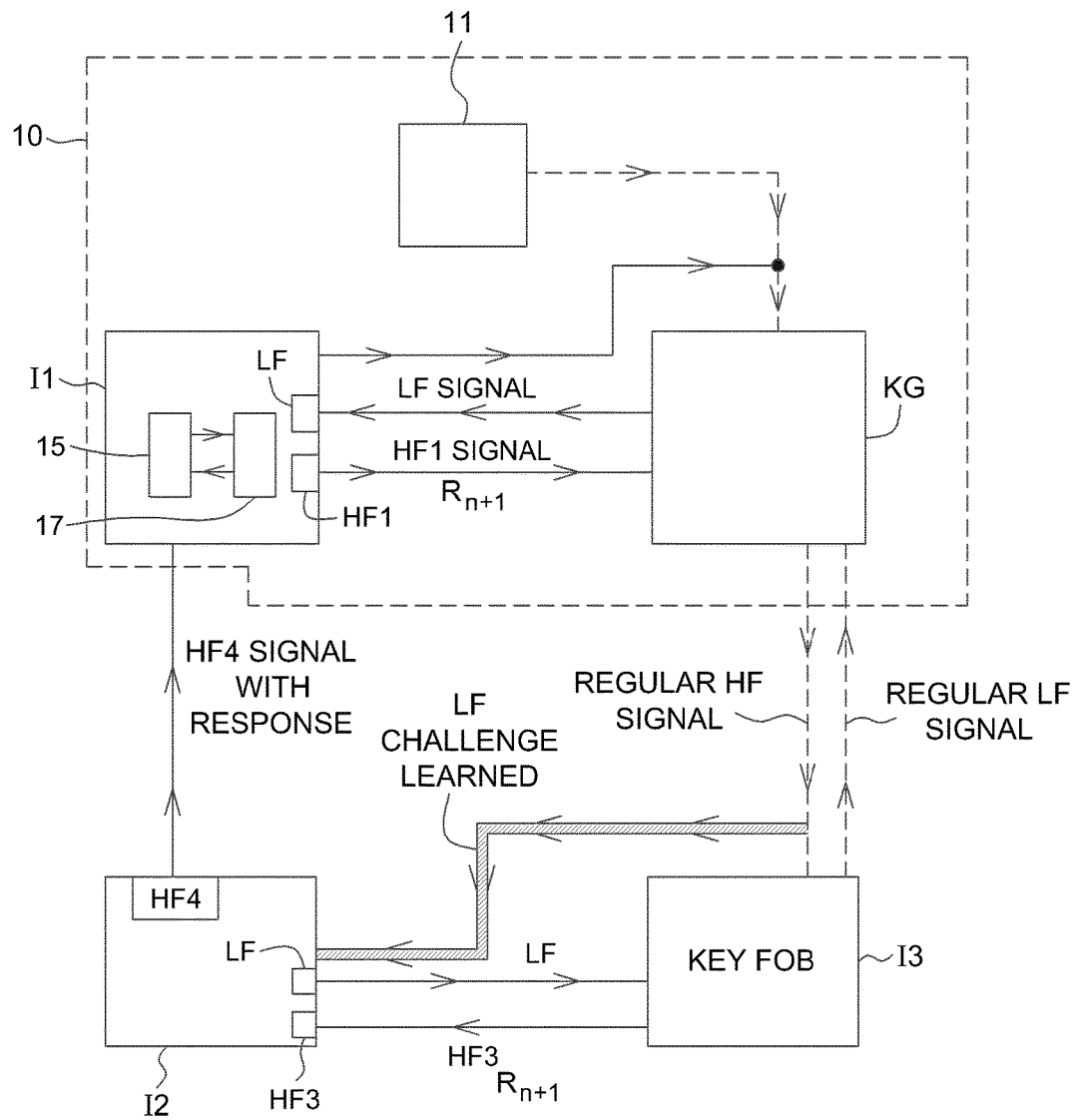
FIG. 3 is a schematic representation of the components of the system according to a variant, where the challenge is constant.

In the case where the challenge is identical from one instance to another, meaning that the challenge is always the same, but the response computed by the key fob changes from time to time (in order to preserve the integrity of the system), it is actually slightly less complicated to remote start the car. Indeed, the second interface "learns" the challenge, and therefore does not need to wait for the challenge to be issued before it presents the challenge to the key. The process is as follows as shown in FIG. 3.

Interface I2 learns the challenge by the same process outlined earlier, or has it programmed therein. Interface 2 challenges the key fob with "learned" challenge signal LF. The key fob responds by way of signal HF3 the next code in the series of rolling codes. Interface 2 then sends the remote start signal to I1 by way of HF4 along with the response received in the earlier step. I1 receives the HF4 signal with embedded response. I1 demodulates the signal and stores the response in memory. I1 then sends a start signal to Keyless Go unit. KG issues the challenge with LF signal. I1 then responds to KG with authentication response stored in memory, simulating that the user has performed the necessary steps to start the car.

In another variation, the codes are stored in the car when the user leaves the car. Succinctly, the first interface sends a signal to the second interface to emit the challenge already learned. The back and forth communication between the various units proceeds as above, and the responses are stored in a memory in the first interface. When the user desires to remotely start the car, the correct, computed responses are provided to the car in sequence in order to mimic unlocking the door, and then performing the necessary sequence of steps to start the car. This has the advantage of introducing no delay in communication between the key fob and the car, since the correct responses are calculated when the user is in proximity of the car, and delivered only then the user wishes to remote start the car.

Although the present invention has been explained hereinabove by way of a preferred embodiment thereof, it should be pointed out that any modifications to this preferred embodiment within the scope of the appended claims is not deemed to alter or change the nature and scope of the present invention.

The invention claimed is:

1. In a vehicle equipped with a keyless go system, a method for remote starting the vehicle comprising:
providing a first interface, the first interface being located inside the vehicle and proximate the keyless go system, the first interface being adapted to communicate with the keyless go system through a first low frequency transceiver and a first high frequency transceiver, and being further provided with a second high frequency transceiver;
providing a second interface, the second interface being located proximate a key fob linked to the vehicle, the second interface being adapted to communicate with the key fob through a second low frequency transceiver and a third high frequency transceiver, and being further provided with a fourth high frequency transceiver;
capturing a challenge with the first low frequency transceiver, the challenge being emitted by the keyless go system;
converting the challenge into a format adapted to be transmitted by the second high frequency transceiver;
receiving the challenge with the fourth high frequency transceiver;
converting the challenge from the fourth high frequency transceiver for transmission by the second low frequency transceiver;
at the key fob
receiving the challenge;
computing a response thereto; and
emitting the response;
receiving the response with the third high frequency transceiver;
converting the response into a format adapted to be transmitted by the fourth high frequency transceiver;
receiving the response with the second high frequency transceiver;
converting the response from the second high frequency transceiver for transmission by the first high frequency transceiver;
delivering the response to the keyless go system; and
if the response is a proper response to the challenge, initiating the starting of the vehicle by the keyless go system.

2. A system for remote starting a vehicle equipped with a keyless go system, the keyless go system being adapted to start the vehicle upon receipt of a proper response to a challenge emitted by the keyless go system, the response being computed by a key fob, the system comprising:
a. a first interface located proximate the keyless go system, and including a first low frequency transceiver, a first high frequency transceiver and a second high frequency transceiver;
b. a second interface located proximate the key fob, the second interface including a second low frequency transceiver, a third high frequency transceiver and a fourth high frequency transceiver;
the first interface being adapted to capture the challenge with the first low frequency transceiver and emit the challenge through the second high frequency transceiver; and to receive the response through the second high frequency transceiver and forward the response to the keyless go system through the first high frequency transceiver; and
the second interface being adapted to receive the challenge through the fourth high frequency transceiver and to forward the challenge to the key fob through the second low frequency transceiver; and to receive the response with the third high frequency transceiver and to emit the response through the fourth high frequency transceiver.

3. A system according to claim 2, wherein the first and second high frequency transceivers are a single unit and wherein the third and fourth high frequency transceivers are a single unit.

4. A system according to claim 2, wherein the first and third high frequency transceivers are adapted to communicate on a frequency identical to a frequency of the key fob.

5. A system according to claim 2, wherein the second and fourth high frequency transceivers are adapted to communicate on a same frequency.

6. A system according to claim 5, wherein the same frequency is a frequency identical to the frequency of the key fob.

7. A system according to claim 2, wherein a range of communication between the first and second interfaces is greater than a range of communication between the keyless go system and the key fob.

8. A system according to claim 2, wherein the challenge is a same challenge each time.

9. A system according to claim 2, wherein the challenge is different from time to time.

* * * * *